US012670357B2

(12) United States Patent (10) Patent No.: US 12,670,357 B2
Srinivasa et al. (45) Date of Patent: Jun. 30, 2026

(54) NEAR MEMORY SPARSE MATRIX COMPUTATION IN DEEP NEURAL NETWORK

(71) Applicant: Intel Corporation, Santa Clara, CA (US)

(72) Inventors: Srivatsa Rangachar Srinivasa, Hillsboro, OR (US); Jainaveen Sundaram Priya, Hillsboro, OR (US); Bradley A. Jackson, Lake Oswego, OR (US); Ambili Vengallur, Bangalore (IN); Dileep John Kurian, Bangalore (IN); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 17/550,405

(22) Filed: Dec. 14, 2021

(65) Prior Publication Data

US 2022/0101091 A1 Mar. 31, 2022

(30) Foreign Application Priority Data

Oct. 26, 2021 (IN) .............................. 202141048956

(51) Int. Cl.
G06N 3/04 (2023.01)
G06F 7/544 (2006.01)
(Continued)
(52) U.S. Cl.
CPC .............. *G06N 3/04* (2013.01); *G06N 3/063* (2013.01); *G06F 7/5443* (2013.01); *G06F 17/16* (2013.01)

(58) Field of Classification Search
CPC ......... G06F 7/5443; G06F 17/16; G06N 3/04; G06N 3/0464; G06N 3/063
See application file for complete search history.

(56) References Cited

U.S. PATENT DOCUMENTS 10,817,260 B1 * 10/2020 Huang .................... G06F 7/523
10,915,297 B1 * 2/2021 Halutz .................. G06F 17/153
(Continued)

OTHER PUBLICATIONS

Anderson, Andrew, "High-Performance Low-Memory Lowering: GEMM-based Algorithms for DNN Convolution," 2020 IEEE 32nd International Symposium on Computer Architecture and High Performance Computing (SBAC-PAD), Sep. 2020; 8 pages.
(Continued)

*Primary Examiner* — Emily E Larocque
*Assistant Examiner* — Jerome Anthony Klosterman, II
(74) *Attorney, Agent, or Firm* — Akona IP PC

(57) ABSTRACT

A DNN accelerator includes a multiplication controller controlling whether to perform matrix computation based on weight values. The multiplication controller reads a weight matrix from a WRAM in the DNN accelerator and determines a row value for a row in the weight matrix. In an embodiment where the row value is one, a first switch sends a read request to the WRAM to read weights in the row and a second switch forms a data transmission path from an IRAM in the DNN accelerator to a PE in the DNN accelerator. The PE receives the weights and input data stored in the IRAM and performs MAC operations. In an embodiment where the row value is zero, the first and second switches are not triggered. No read request is sent to the WRAM and the data transmission path is not formed. The PE will not perform any MAC operations.

20 Claims, 13 Drawing Sheets

(51) Int. Cl.
G06F 17/16 (2006.01)
G06N 3/063 (2023.01)

(56) References Cited

U.S. PATENT DOCUMENTS

| | | | | |
|---|---|---|---|---|
| 2018/0095929 | A1* | 4/2018 | Zivkovic | G06F 13/4286 |
| 2018/0173437 | A1* | 6/2018 | Mishra | G06F 9/30036 |
| 2019/0114535 | A1* | 4/2019 | Ng | G06N 3/045 |
| 2019/0147327 | A1* | 5/2019 | Martin | G06F 17/15 |
| 2020/0210806 | A1* | 7/2020 | Lee | G06N 3/04 |
| 2021/0357748 | A1* | 11/2021 | Shin | G06N 3/0464 |
| 2022/0100468 | A1* | 3/2022 | Han | G06N 3/048 |

OTHER PUBLICATIONS

Bell, Nathan, et al., "Implementing Sparse Matrix-Vector Multiplication on Throughput-Oriented Processors," SuperComputing 2009 Conference (SC09), Nov. 2009; 11 pages.

Ciresan, Dan, et al., "Multi-col. Deep Neural Networks for Image Classification," IEEE 2012; 8 pages.

Dong, She, et al., "Spartan: A Sparsity-Adaptive Framework to Accelerate Deep Neural Network Training on GPUs," IEEE Transactions on Parallel and Distributed Systems, vol. 32, No. 10, Oct. 2021; 16 pages.

Huang, Qiangui, et al., "Learning to Prune Filters in Convolutional Neural Networks," 2018 IEEE Winter Conference on Applications of Computer Vision, Mar. 2018; 10 pages.

Nurvitadhi, Eriko, et al., "A Sparse Matrix Vector Multiply Accelerator for Support Vector Machine," IEEE 2015; 8 pages.

Nurvitadhi, Eriko, et al., "Hardware Accelerator for Analytics of Sparse Data," 2016 Design, Automation & Test in Europe Conference & Exhibition, Mar. 2016; 6 pages.

Qin, Eric, et al., "SIGMA: A Sparse and Irregular GEMM Accelerator with Flexible Interconnects for DNN Training," 2020 IEEE International Symposium on High Performance Computer Architecture (HPCA), Feb. 2020; 13 pages.

Soltaniyeh, Mohammadreza, et al., "Synergistic CPU-FPGA Acceleration of Sparse Linear Algebra," arXiv:2004.13907v1 [cs.DC] Apr. 29, 2020; 12 pages.

Song, Kaiyou, et al., "Multi-Scale Attention Deep Neural Network for Fasat Accurate Object Detection," IEEE Transactions on Circuits and Systems for Video Technology, vol. 29, No. 10, Oct. 2019; 14 pages.

* cited by examiner

Weight Matrix
630

| Row Indices 635 | Column Indices 633 | Weights 637 | Column Indices 633 | Weights 637 |
|---|---|---|---|---|
| 0 | 1 | 3 | 0 | 4 |
| 1 | 1 | 5 | 0 | 6 |

FIG. 6B

Uncompressed Input Feature Map Matrix 640

Row Indices 645

Elements 647

Compressed Input Feature Map Matrix
650

| Row Indices 655 | Column Indices 653 | Elements 657 | Column Indices 653 | Elements 657 | Column Indices 653 | Elements 657 |
|---|---|---|---|---|---|---|
| 0 | 0 | 0 | 2 | 1 | 0 | 3 |
| 1 | 0 | 0 | 0 | 0 | 0 | 0 |
| 2 | 0 | 0 | 2 | 7 | 1 | 8 |

FIG. 6D

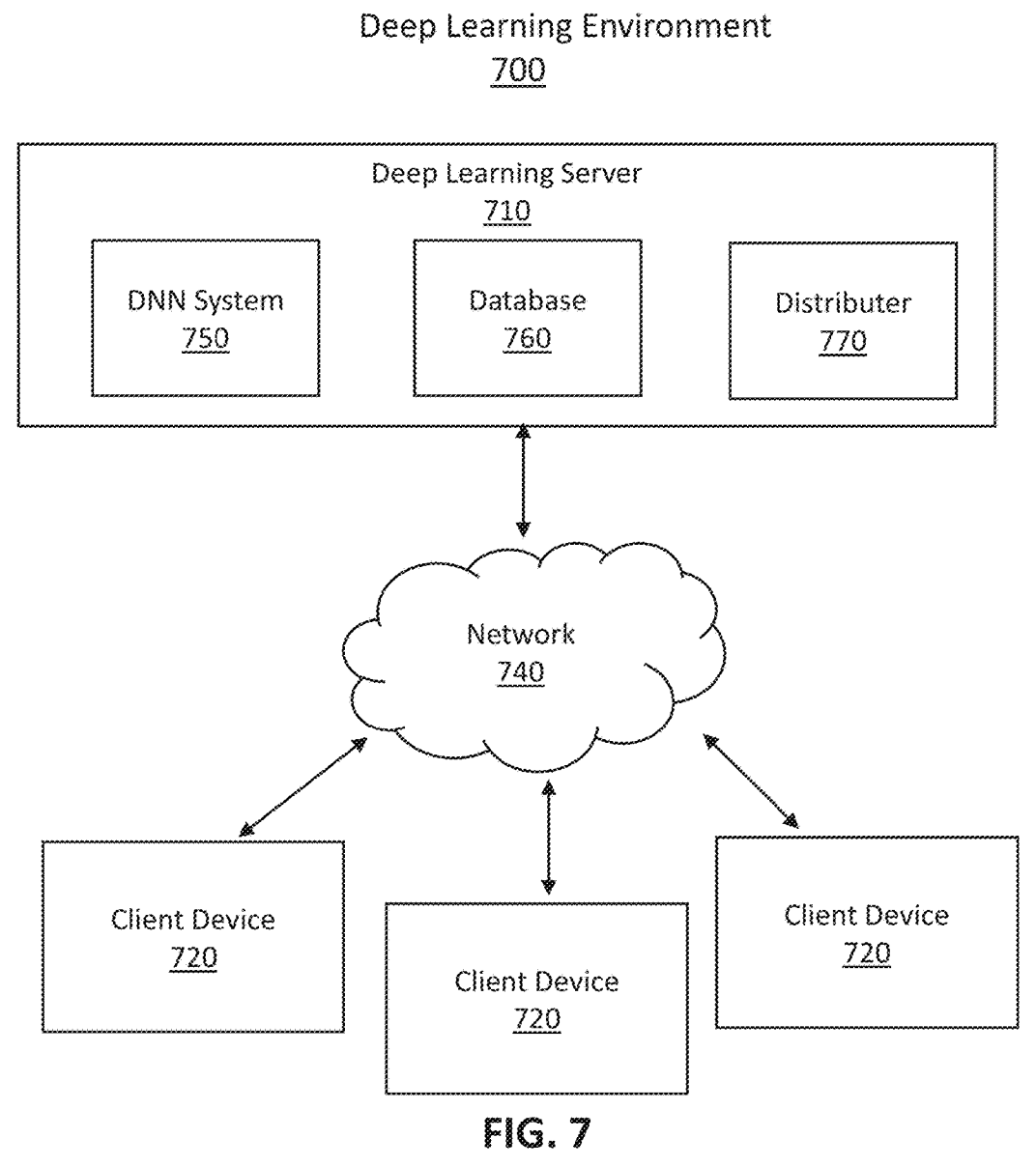

Deep Learning Environment
700

Deep Learning Server
710

DNN System
750

Database
760

Distributer
770

Network
740

Client Device
720

Client Device
720

Client Device
720

FIG. 7

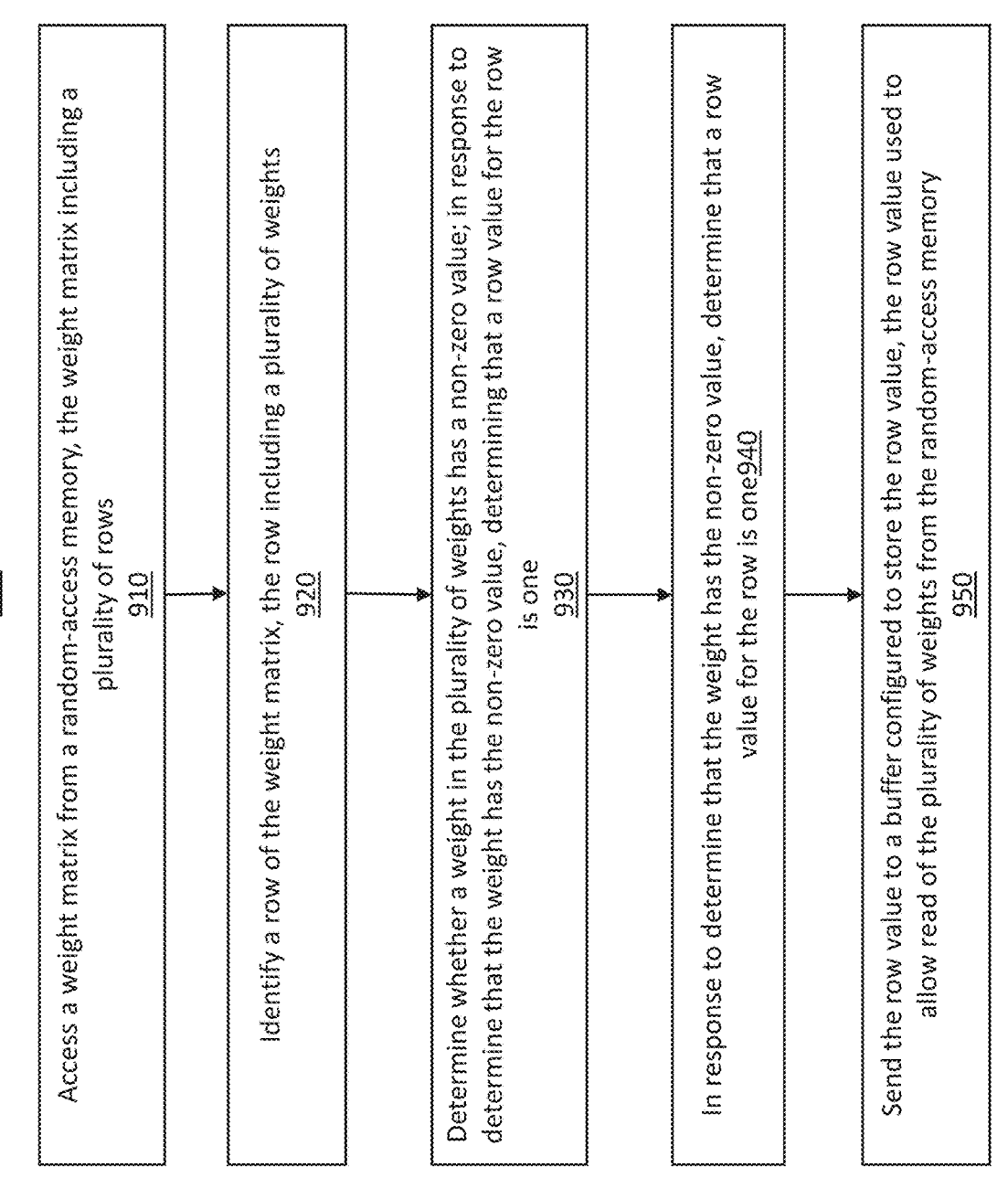

900

Access a weight matrix from a random-access memory, the weight matrix including a plurality of rows
910

Identify a row of the weight matrix, the row including a plurality of weights
920

Determine whether a weight in the plurality of weights has a non-zero value; in response to determine that the weight has the non-zero value, determining that a row value for the row is one
930

In response to determine that the weight has the non-zero value, determine that a row value for the row is one
940

Send the row value to a buffer configured to store the row value, the row value used to allow read of the plurality of weights from the random-access memory
950

FIG. 9

NEAR MEMORY SPARSE MATRIX COMPUTATION IN DEEP NEURAL NETWORK

CROSS REFERENCE TO RELATED APPLICATION

This application claims the benefit of Indian Patent Application No. 202141048956, filed Oct. 26, 2021, which is incorporated by reference its entirety.

TECHNICAL FIELD

This disclosure relates generally to neural networks, and more specifically, to sparse matrix computation in deep neural networks (DNNs).

BACKGROUND

DNNs are now being used extensively for a variety of artificial intelligence applications ranging from computer vision to speech recognition and natural language processing. A DNN usually includes an input layer, hidden layers, and an output layer. A hidden layer transforms an input matrix representing an input feature map (IFM) into an output matrix representing an output feature map (OFM) through matrix computation with trained datasets. DNNs have been very successful in various applications such as object detection, image classification, and so on. However, DNN models (both weighs and activations) have shown to exhibit considerable amount of sparsity, causing significant consumption of computing resources and time during matrix computation operations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6B illustrates a weight matrix converted from the weight matrix in FIG. 6A by a compression module, in accordance with various embodiments.

FIG. 6D illustrates a compressed state of the IFM matrix in FIG. 6A, in accordance with various embodiments.

FIG. 7 illustrates a deep learning environment, in accordance with various embodiments.

FIG. 9 is a flowchart showing a method of controlling sparse matrix computation in a DNN, in accordance with various embodiments.

DETAILED DESCRIPTION

Overview

Figure 1:
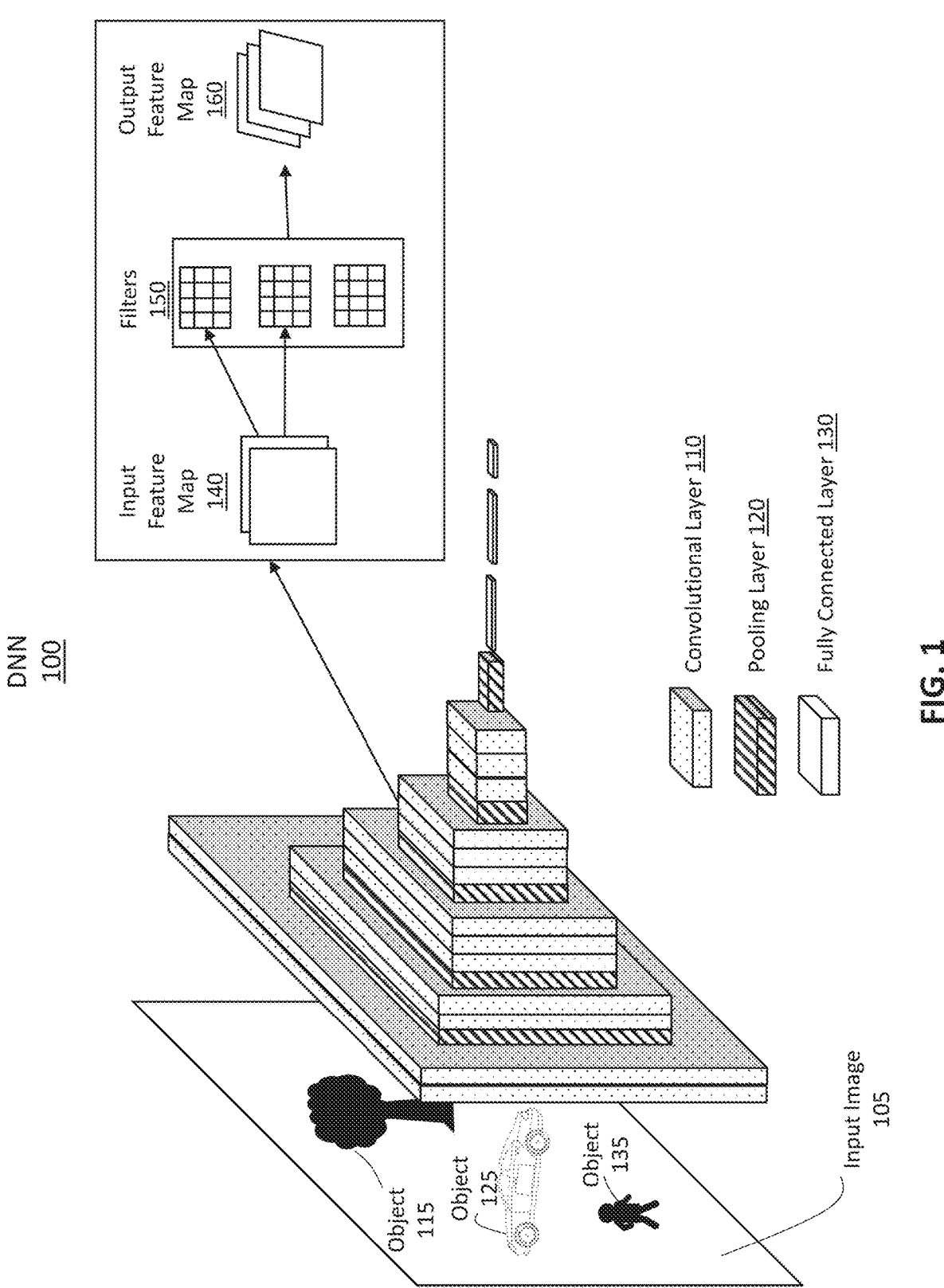
FIG. 1 illustrates an architecture of an example DNN, in accordance with various embodiments.

DNNs are characterized by the ability to produce effective abstract representations of data using automatic latent feature extraction. DNNs have been used for solving complex problems in various fields, such as inference, object detection, recommendation systems, video rendering, and so on. Training a DNN involves identifying "weights," which are useful in solving a particular problem, in the network. Matrix multiplication is the fundamental DNN computation involving IFMs and weights. Matrix multiplication operations can consume a significant amount of computing resources and time. Hence, accelerating sparse matrix computation operations can alleviate the performance bottleneck of training DL models.

Both weights and features can be sparse in nature. Matrix inputs from DNN workloads are large and sparse and at the same time algorithms introduce additional sparsity without affecting the overall accuracy. Therefore, there have been approaches which address sparsity as part of the hardware implementation. A sparse matrix is a matrix in which a number of the elements are zero. Sparse matrix computation approaches require the input matrix to be compressed in order to obtain any benefit.

An example approach executes sparse matrix computation in a GPU (graphics processing unit) based system, which can offer improved throughput by virtue of massive multithreading and SIMD (single instruction, multiple data) styled executions. These multithreads can share the on-chip memories of computation. However, even with the availability of numerous compute resources, performance is limited by poor memory bandwidth due to mapping difficulties because of small memories and non-contiguous memory accesses.

In another approach, hardware accelerators can make use of compressed index information for identifying the non-zero multiplicand and multiplier elements. Such hardware accelerators either break the matrices into multiple smaller chunks to compute in parallel or use dedicated memory space to store the intermediate data. Thus, additional data mapping schemes need to be employed. The compressed sparse information is used to determine the elements to be multiplied. However, compute resources fail to be judiciously used. Sufficiently high level of parallelism fails to be achieved. Also, the cost for data movement can still be high.

In yet another approach, complier is used to generate sparsity information through compression schemes and that will be appended with the sparse data. This approach is generally employed when one of the matrices is static and does not change over multiple sparse matrix computation operations (e.g., weight matrix in DNNs). Generating the compressed sparse information through compilers can work for static matrices. However, it does not work as well for a constantly changing input matrix. It is difficult to employ compliers to generate compressed information for dynamic matrix data or when the matrix is changing during application run time.

The approaches described above can work for cases where it is not complicated to manage memory space, e.g., a case where a sparse matrix is multiplied with a vector, as compressed format is needed for the matrix but not for the vector input. However, based on the matrix dimension and the sparsity nature of both the matrices during sparse matrix computation, sparse information may need more memory space than the non-zero data elements. By breaking one of the matrices into multiple column vectors (number of vectors=columns of a matrix), the approaches described above can be used to perform sparse matrix computation. This avoids the need for compressed sparse formatting for one of the matrices. However, the amount of computation can be higher than desired. The increased number of multiplications directly contribute to increased data movement which is a major bottleneck.

Embodiments of the present invention relate to DNN accelerators capable of near memory sparse matrix computation. An example DNN accelerator includes a multiplication controller, a buffer, two switches, and an array of process elements (PEs), which are arranged near a random-access memory (RAM) storing weights ("weight random access memory (WRAM)"), a RAM storing input ("input RAM (TRAM)"), and a RAM storing output ("output RAM (ARAM)"). The input can be an IFM matrix (or a portion of the IFM matrix) of the DNN layer. The output can be the OFM matrix (or a portion of the OFM matrix) of the DNN layer.

The multiplication controller controls sparse matrix computation by the DNN accelerator. For instance, the multiplication controller determines whether and when to read data from the IRAM and WRAM for MAC operations by the PE based on weight values. For instance, the multiplication controller accesses a weight matrix from the WRAM and determines a row value for each of the rows in the weight matrix. For instance, the multiplication controller determines that the row value of a row having no non-zero valued weight is zero and the row value of a row having at least one non-zero valued weight is one. The multiplication controller stores row values in a buffer. The first switch, which controls the read operation from the WRAM, can be triggered by a non-zero row value. After the first switch is triggered, it sends a read request to the WRAM to read the weights in the row. In an embodiment, the weights are read into the IRAM. The second switch, which controls transmission of data from the IRAM to the PE, can also be triggered by the non-zero row value. As the second switch is triggered, the input data and weights can be transmitted into the PE. The PE then performs MAC operations on the input data and weights. In other words, when a row has one or more non-zero valued weights, the multiplication controller 255 allows the MAC operations. In contrast, when all the weights in a row are zero valued (i.e., the row value is zero), the two switches are not triggered and no data is sent to the PE and the PE does not perform any MAC operations. Therefore, the multiplication controller and the two switches can ensure that the DNN accelerator performs matrix computation when needed and prevents the DNN accelerator from performing meaningless matrix computation (i.e., when all the weights are zero valued, as the result of the matrix computation, if performed, will be zero). Thus, the multiplication controller and switches can improve the efficiency of the DNN accelerator in matrix computation and avoids waste of computation resources on meaningless matrix computation operations. Also, as the multiplication controller and switches are arranged near the IRAM and WRAM, data movement required for controlling matrix computation is reduced or even minimized.

In some embodiments, the DNN accelerator also includes a compression module that compresses an IFM matrix to further improve the efficiency of DNN acceleration. In embodiments where an IFM matrix is compressed, the PE may perform demultiplexing operations on results of multiplication operations to reconstruct the output. Moreover, the DNN accelerator may be used as one DNN computation tile. A number of such DNN accelerators can be arranged in parallel to form a tile architecture that can be used for accelerating a DNN layer. The DNN accelerators in the tile architecture may share one system memory that stores the input or OFM of the DNN layer. With such as tile architecture, the overall memory storage requirement can be reduced.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN Architecture

FIG. 1 illustrates an architecture of an example DNN 100, in accordance with various embodiments. For purpose of illustration, the DNN 100 in FIG. 1 is a Visual Geometry Group (VGG)-based convolutional neural network (CNN). In other embodiments, the DNN 100 may be other types of DNNs. The DNN 100 is trained to receive images and output classifications of objects in the images. In the embodiment of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers.

The convolutional layers 110 summarize the presence of features in the input image 105. The convolutional layers 110 function as feature extractors. The first layer of the DNN 100 is a convolutional layer 110. In an example, a convolutional layer 110 performs a convolution to an IFM 140 by using filters 150, generates an OFM 160 from the convolution, and passes the OFM 160 to the next layer in the sequence. The IFM 140 may include a plurality of IFM matrices. The filters 150 may include a plurality of weight matrices. The OFM 160 may include a plurality of OFM matrices. For the first convolutional layer 110, which is also the first layer of the DNN 100, the IFM 140 is the input image 105. For the other convolutional layers, the IFM 140 may be an output of another convolutional layer 110 or an output of a pooling layer 120. The convolution is a linear operation that involves the multiplication of the filters 150 with the IFM 140. A filter may be a 2-dimensional array of weights. Weights of the filters can be initialized and updated by backpropagation using gradient descent. The magnitudes of the weights of the filters can indicate importance of the filters 150 in extracting features from the IFM 140. A filter can be smaller than the IFM 140.

The multiplication applied between a filter-sized patch of the IFM 140 and a filter may be a dot product. A dot product is the element-wise multiplication between the filter-sized patch of the IFM 140 and the corresponding filter, which is then summed, always resulting in a single value. Because it results in a single value, the operation is often referred to as the "scalar product." Using a filter smaller than the IFM 140 is intentional as it allows the same filter (set of weights) to be multiplied by the IFM 140 multiple times at different points on the IFM 140. Specifically, the filter is applied systematically to each overlapping part or filter-sized patch of the IFM 140, left to right, top to bottom. The result from multiplying the filter with the IFM 140 one time is a single value. As the filter is applied multiple times to the IFM 140, the multiplication result is a two-dimensional array of output values that represent a filtering of the IFM 140. As such, the 2-dimensional output array from this operation is referred to a "feature map."

In some embodiments, the OFM 160 is passed through an activation function. An example activation function is the rectified linear activation function (ReLU). ReLU is a calculation that returns the value provided as input directly, or the value 0 if the input is 0 or less. The convolutional layer 110 may receive several images as input and calculates the convolution of each of them with each of the filters. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size F filters (e.g., a filter is of dimensions F×F×D pixels), the S step with which the window corresponding to the filter is dragged on the image (e.g., a step of 1 means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The DNN 100 includes 16 convolutional layers 110. In other embodiments, the DNN 100 may include a different number of convolutional layers.

The pooling layers 120 downsample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies a linear combination and an activation function to the input vector and generates an output vector. The output vector may contain as many elements as there are classes: element i represents the probability that the image belongs to class i. Each element is therefore between 0 and 1, and the sum of all is worth 1. These probabilities are calculated by the last fully connected layer 130 by using a logistic function (binary classification) or a softmax function (multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

Example Sparse DNN Accelerator

Figure 2:
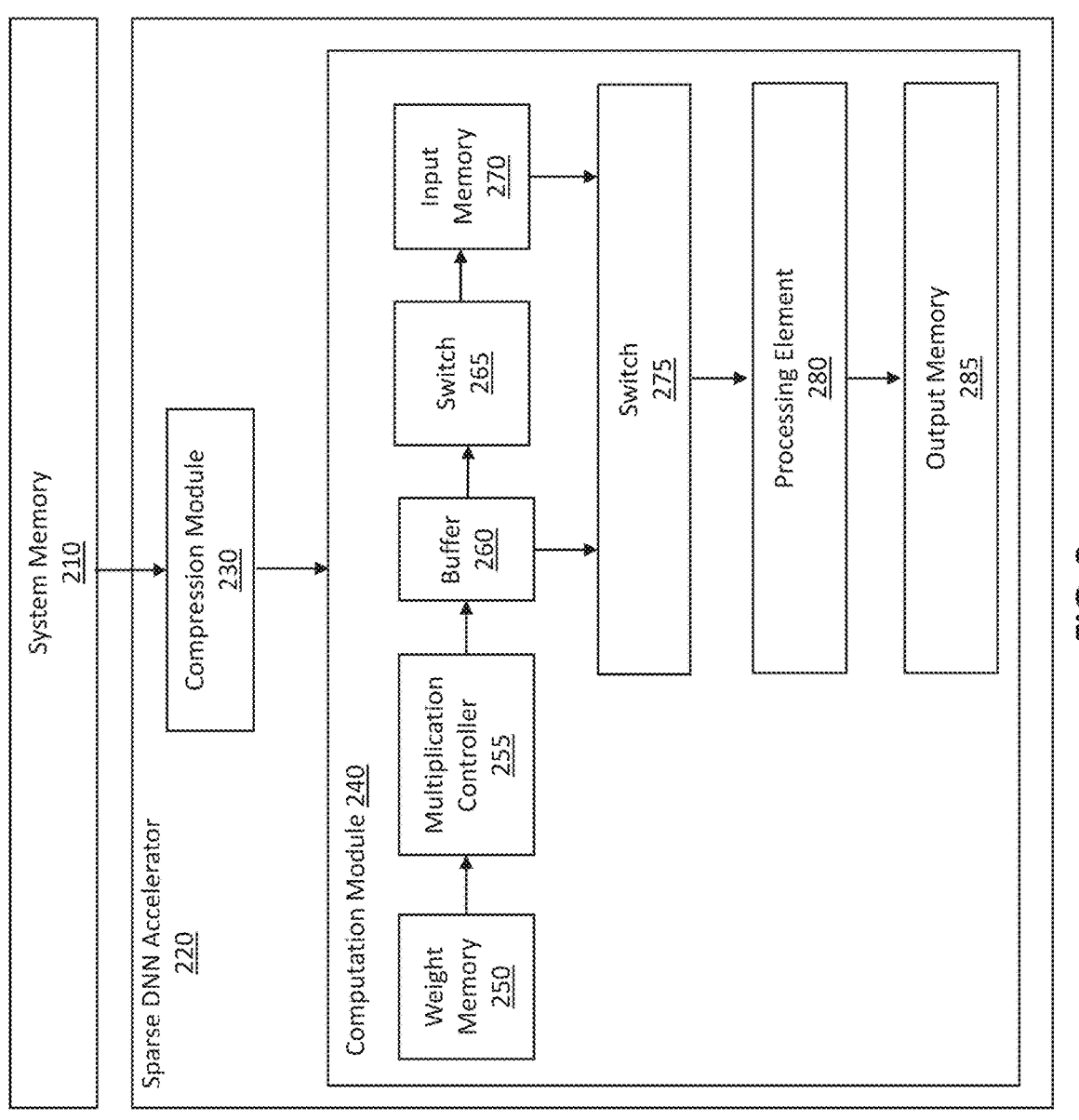
FIG. 2 illustrates an architecture of an example sparse DNN accelerator, in accordance with various embodiments.

FIG. 2 illustrates an architecture of an example sparse DNN accelerator 220, in accordance with various embodiments. The sparse DNN accelerator 220 accelerates convolution in a DNN layer through sparse matrix computation. The sparse DNN accelerator 220 includes a compression module 230 coupled to a system memory 210 and a computation module 240. In other embodiments, the sparse DNN accelerator 220 may include fewer, more, or different components.

The system memory 210 stores the IFM and weights of the filters of the DNN layer. The system memory 210 is external to the sparse DNN accelerator 220. The compression module 230 can compress an IFM matrix to reduce sparsity in the IFM matrix. In some embodiments, the compression module 230 compress the IFM into various compressed sparse formats, e.g., coordinate list (COO), compressed sparse row (CSR), compressed row storage (CRS), and so on. In some embodiment, the compression module 230 does not compress the IFM despite the sparsity in the IFM. The IFM can be transmitted to the computation module 240 directly from the system memory 210. The compression module 230 may also compress weight matrices. More details regarding IFM matrix and weight matrix are described below in conjunction with FIGS. 6A-D.

The computation module 240 performs matrix computation on the IFM and filters of the DNN layer to generate an OFM of the DNN layer. For instance, the computation module 240 performs convolution in a convolutional layer. The computation module 240 includes a weight memory 250, a multiplication controller 255, a buffer 260, a switch 265, an input memory 270, another switch 275, a PE 280, and an output memory 285. The weight memory 250 stores weights of filters in the DNN layer. In some embodiments, the weight memory 250 stores the weights of one filter or a subset of the filters. The input memory 270 stores input data from the system memory 210 or compression module 230. The input data may be the IFM of the DNN layer, a compressed version of the IFM, or a portion of the uncompressed or compressed IFM. The output memory 285 stores the OFM of the DNN layer, which is the output of the PE 280. The weight memory 250, input memory 270, or output memory 285 may be a RAM including one or more register files. The input memory 270 may be register files with wide bandwidth to facilitate efficient data transmission from the input memory 270 to the PE 280.

The multiplication controller 255 determines whether the computation module 240 performs matrix computation based on weights stored in the weight memory 250. In some embodiments, the multiplication controller 255 accesses a weight matrix from the WRAM. The weight matrix may be a filter, or a portion of a filter. The weight matrix includes one or more rows. Each row includes weights. A weight may have a value of zero or non-zero. The multiplication controller 255 determines a row value for each row in the weight matrix based on the values of the weights in the row. For instance, the multiplication controller 255 determines whether any weights in the row have non-zero values. In an embodiment where the multiplication controller 255 determines that at least one weight in the row has a non-zero value, the multiplication controller 255 determines that the row value of the row is one. In an embodiment where the multiplication controller 255 determines that none of the weights in the row has a non-zero value (i.e., all the weights are zero valued), the multiplication controller 255 determines that the row value of the row is zero.

The multiplication controller 255 stores the row values in the buffer 260. The row values in the buffer 260 control the switches 265 and 275, e.g., by turning the switches 265 and 275 on and off. The switch 265 controls read operation associated with the weight memory 250. The switch 275 controls transmission of data from the input memory 270 to the PE 280. For instance, the switch 265 turns off and does not read data from the weight memory 250 if the row value is zero. A zero valued row value indicates all the weights in the corresponding row have zero values and therefore, no MAC operations need to be done on the weights in this row.

The switch 275 also turns off to block data transmission from the input memory 270 to the PE 280 so that the PE 280 receives no data and will not perform any MAC operations. In contrast, the switch 265 turns on and reads weights of a row from the weight memory 250 if the row value is one. An one valued row value indicates that at least one weight in the corresponding row have a non-zero value and therefore, MAC operations are needed for this row. The weights of the row can be read into the input memory 270. The switch 275 also turns on and allows input data and the weights to be transmitted to the PE 280 from the input memory 270 to the PE 280.

The PE 280 performs MAC operations on the input data and weights. In some embodiments, the PE may be a neuron in the DNN. The PE 280 has two input signals, i.e., the input data and the weights, and an output signal, i.e., the result of the MA operations. In some embodiments, the PE 280 includes an array of multipliers and an array of accumulators. Each multiplier performs a multiplication operation on a portion of the input signals. The accumulators perform accumulation operations. The accumulators are connected to each other. In an embodiment, each accumulator corresponds to a different multiplier and receives output of the multiplier as input. Also, the output of an accumulator is sent to other accumulators (and possibly back to itself) as input via the interconnections between the accumulators. The output of an accumulator can incorporate the output of one or more other accumulator through an accumulation operation of the accumulator.

In other embodiments, such as embodiments where the compression module 230 compresses the IFM, the PE 280 may also include a demultiplexer. The demultiplexer performs demultiplexing operations on results of the multiplication operations. Accumulation operations are performed on the results of the demultiplexing operations to generate the output of the PE 280. The demultiplexing operations reconstruct the output of the PE 280 so that no additional step is needed to reconstruct the output outside the sparse DNN accelerator 220. More details about the PE 280 are described below in conjunction with FIGS. 3 and 5A-C.

Figure 3:
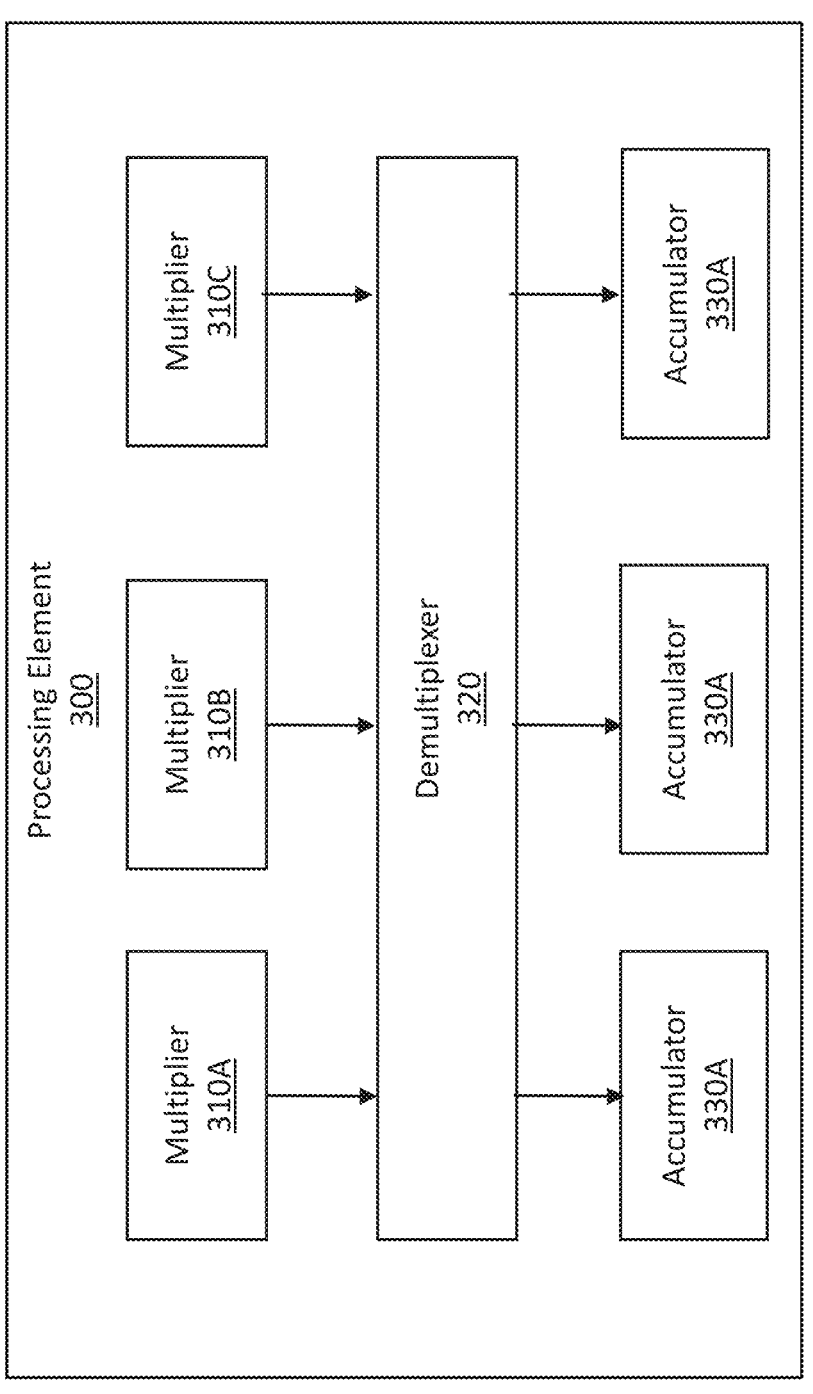
FIG. 3 illustrates an architecture of an example processing element (PE), in accordance with various embodiments.

FIG. 3 illustrates an architecture of an example PE 300, in accordance with various embodiments. The PE 300 is an embodiment of the PE 280 in FIG. 2. The PE 300 may be used in embodiments of the sparse DNN accelerator 220 where the compression module 230 compresses IFMs. As shown in FIG. 3, the PE 300 includes multipliers 310A-C (collectively referred to as "multipliers 310" or "multiplier 310"), a demultiplexer 320, and accumulators 330A-C (collectively referred to as "accumulators 330" or "accumulator 330"). For purpose of simplicity and illustration, the PE 300 includes three multipliers 310 and three accumulators 330. In other embodiments, the PE 300 may include more multipliers 310 or accumulators 330.

Each multiplier 310 performs a multiplication operation on a portion of an IFM of a DNN layer and a portion of filter weights of the DNN layer. A multiplier 310 may return a dot product from each multiplication operation. The outputs of the multipliers 310 are transmitted to the demultiplexer 320. The demultiplexer 320 performs a demultiplexing operation on the outputs of the multipliers 310. The demultiplexer 320 reconstructs the outputs of the multipliers 310 to offset the compression of the IFM done by the compression module 230. The demultiplexer 320 maps the outputs of the multipliers 310 to the corresponding accumulator 330. For instance, the demultiplexer 320 performs a demultiplexing operation on the output of the multiplier 310A and transmits the result of the demultiplexing operation to the accumulator 330A. By integrating the demultiplexer 320 into the PE 300, the reconstruction can be done near memory and no additional reconstruction step outside the sparse DNN accelerator 220 is required. This can minimize data movement and improve computation efficiency.

The accumulators 330 perform accumulation operations on the results of the demultiplexing operations. The accumulators 330 are connected. For instance, the output of the accumulator 330A can be sent to the accumulator 330B through their interconnection. As described above, the accumulator 330B also receives the reconstructed output of the multiplier 310B through the demultiplexer 320. The accumulator 330E can perform an accumulation operation on the output of the accumulator 330A and the reconstructed output of the multiplier 310B. Similarly, the accumulator 330C can perform an accumulation operation on the output of the accumulator 330E and the reconstructed output of the multiplier 310C. Assuming the accumulator 330C is the last accumulator 330 in the sequence. The output of the accumulator 330C is the output of the PE 300.

Figure 4:
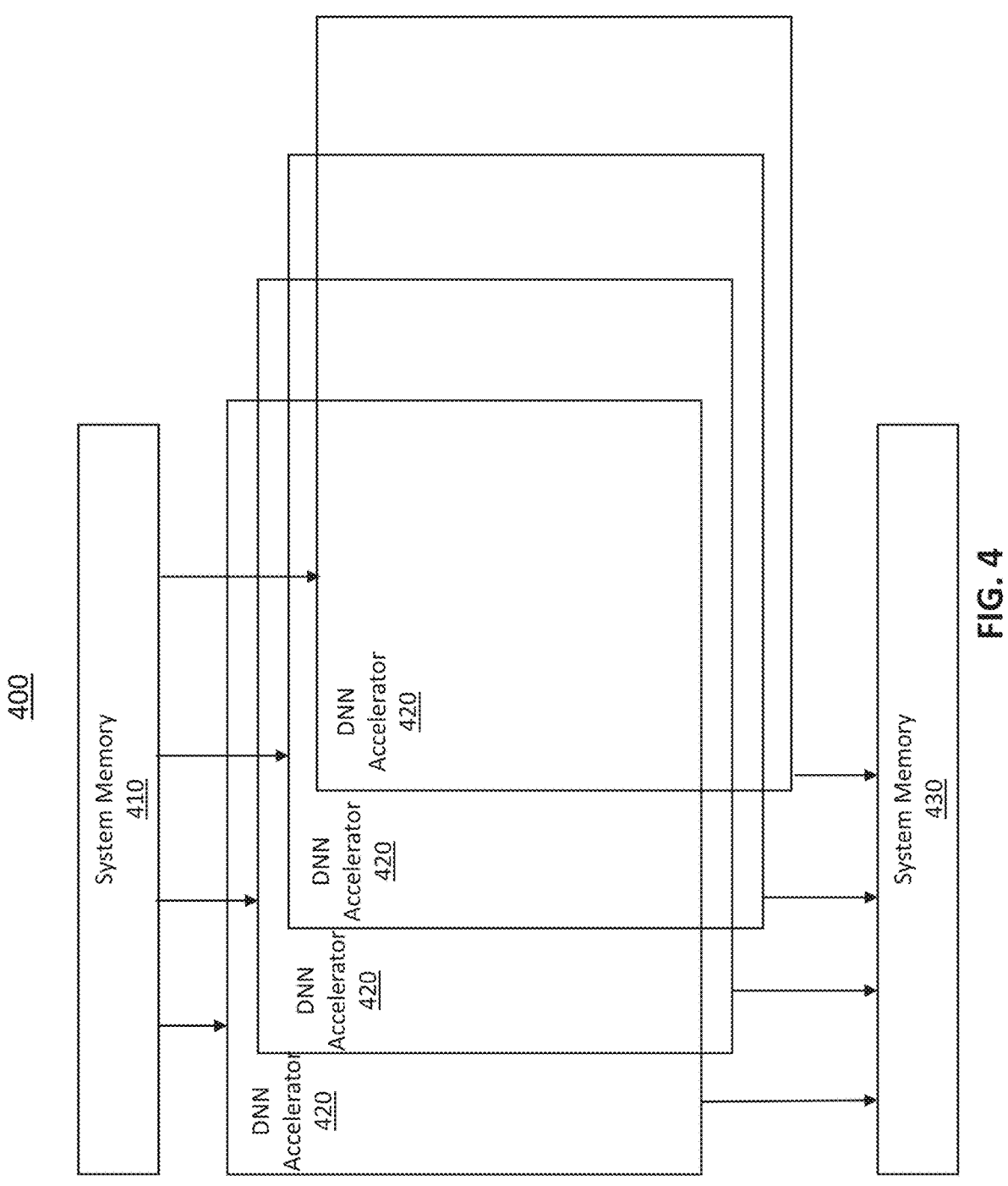
FIG. 4 illustrates an example tile architecture including parallel DNN accelerators, in accordance with various embodiments.

FIG. 4 illustrates an example tile architecture 400 including parallel DNN accelerator tiles 420, in accordance with various embodiments. For purpose of simplicity and illustration, FIG. 4 shows four DNN accelerators 420 (individually referred to as "DNN accelerator tile 420"). In other embodiments, tile architecture 400 may include fewer or more DNN accelerator tiles 420. Each DNN accelerator tile 420 constitutes a DNN computation tile of the tile architecture 400. The tile architecture 400 may be an architecture of a DNN layer, e.g., a convolutional layer.

As shown in FIG. 4, the DNN accelerator tiles 420 are coupled to system memories 410 and 430. The system memory 410 stores an IFM and filters of the DNN layer. The system memory 430 stores an OFM of the DNN layer. In some embodiments, the system memories 410 and 430 are combined into one memory.

The DNN accelerator tile 420 are arranged in parallel and function in parallel. An embodiment of a DNN accelerator tile 420 is the sparse DNN accelerator 220 described above in conjunction with FIGS. 2 and 3. Each DNN accelerator tile 420 receives a portion of the IFM and a portion of the filters from the system memory 410. The DNN accelerator tile 420 performs matrix computation on the data it receives and outputs a portion of the OFM. The outputs of the DNN accelerator tiles 420 are stored in the system memory 430. With such a parallel arrangement of the DNN accelerator tiles 420, the DNN accelerator tiles 420 can share the system memories 410 and 430 without interfering each other. Thus, the overall memory storage requirement for the DNN layer can be reduced.

Example Process of Accelerating Sparse Matrix Computation

Figures 5A, 5B, 5C:
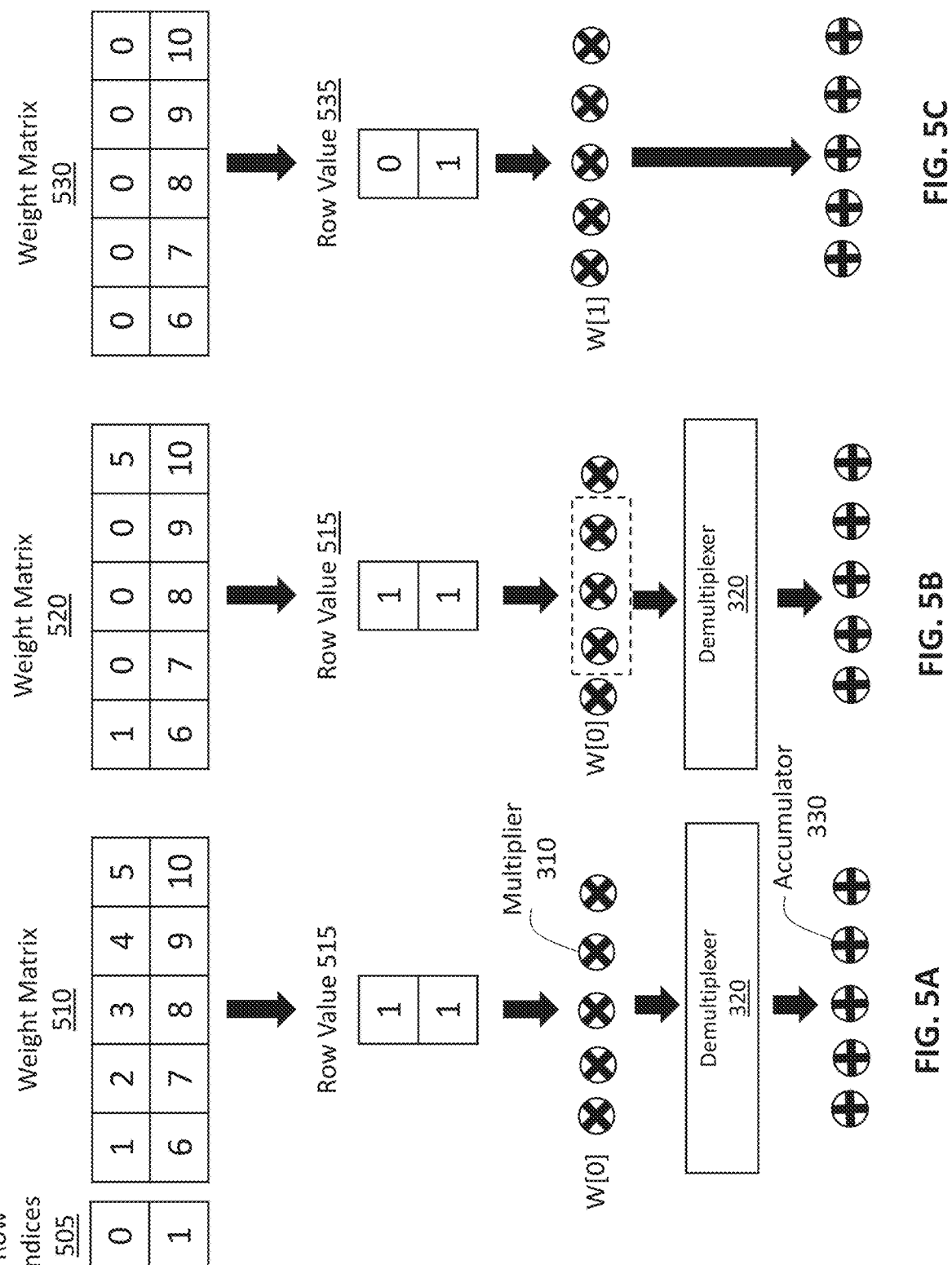
FIGS. 5A-C illustrate three example processes of accelerating sparse matrix computation in a DNN layer, in accordance with various embodiments.

FIGS. 5A-C illustrate three example processes of accelerating sparse matrix computation in a DNN layer, in accordance with various embodiments. FIG. 5A shows a weight matrix 510 including two rows. FIG. 5A also shows indexes of the rows in the row indexes 505. The index of the first row (top row) is 0. The index of the second row (bottom row) is 1. Row values for the row are determined, e.g., by the multiplication controller 255 in FIG. 2. The row value for Row0 is 1, as Row0 includes non-zero valued weights. The row value for Row1 is also 1, as Row1 also includes non-zero valued weights. The weight matrix 510 is in dense representation, as none of its weights are zero valued. As the row values are non-zero, MAC operations on the weights will be triggered. The MAC operations starts with the weights in Row0 (W[0]). FIG. 5 shows five multipliers 310, each of which multiplies a weight in Row0 with input data (not shown in FIG. 5A). In the embodiment of FIG. 5A, the input data is in a compressed sparse format, e.g., the IFM has been compressed by the compression module 230. As the input data has been compressed, next the results of the multiplication operations are sent to the demultiplexer 320 for reconstructing the outputs of the multipliers 310. Further, the output of the demultiplexer 320 is transmitted to five accumulators 330 to perform accumulator functions.

Different from FIG. 5A, FIG. 5B shows a weight matrix 520 with sparsity. Row0 of the weight matrix 520 includes two non-zero valued weights and three zero valued weights. Even though Row0 has sparsity, the row value is still 1 because there are two non-zero valued weights, so it is still necessary to perform matrix computation on Row0. Similar to FIG. 5, the weights in Row0 are sent to five multipliers 310 that multiply the weights with an input data. The input data in the embodiment of FIG. 5B is also compressed data. Thus, the results of the multiplication operations are sent to the demultiplexer 320 for reconstruction. The output of the demultiplexer 320 is transmitted to five accumulators 330 to perform accumulator functions.

FIG. 5C shows a weight matrix 530 with higher sparsity. Row0 of the weight matrix 520 includes five zero valued weights and does not include any non-zero valued weights. Accordingly, it is not necessary to perform matrix computation on Row0 and the row value for Row0 is 0. Row0 is not sent to the multipliers 310. In contrast, Row1 includes non-zero value weights and has a row value of 1. So the weights in Row1 ("W[1]") are sent to the multipliers 310 and are multiplied with input data. The input data in the embodiment of FIG. 5C is not in any compressed sparse format, meaning the input data are extracted from the IFM but not compressed by the compression module 230. Thus, FIG. 5C does not include the demultiplexer 320 as reconstruction is not needed. The outputs of the multipliers 310 are directly transmitted to the five accumulators 330 to perform accumulator functions.

Example Weight Matrix and IFM Matrix

Figure 6A:
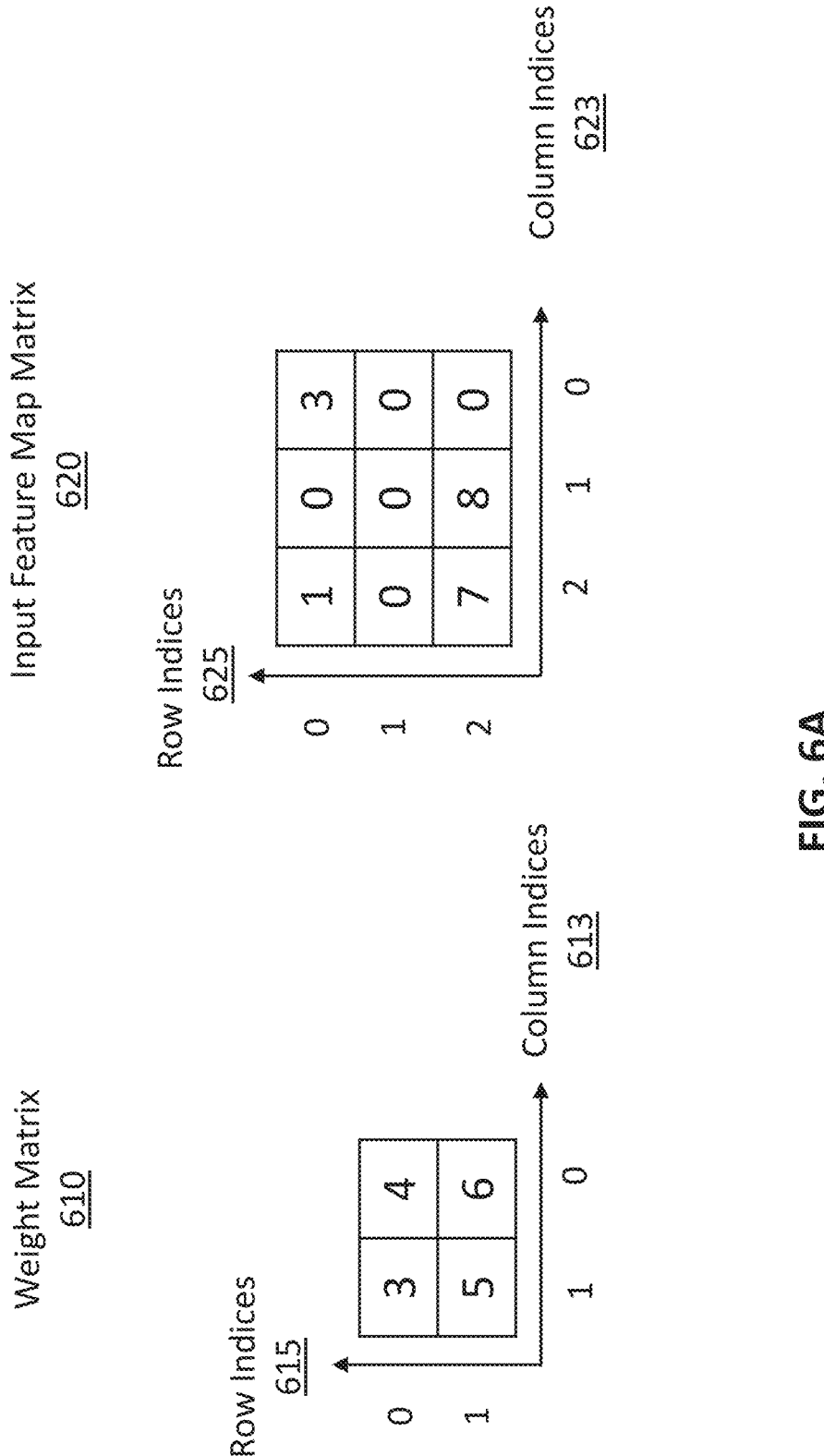
FIG. 6A illustrates a weight matrix and an IFM matrix stored in a system memory associated with a DNN accelerator, in accordance with various embodiments.

FIG. 6A illustrates a weight matrix 610 and an IFM matrix 620 stored in a system memory associated with a DNN accelerator, in accordance with various embodiments. The system memory may be the system memory 210 in FIG. 2. As shown in FIG. 6A, the weight matrix 610 includes four weights arranged in two rows and two columns. The weights all have non-zero values. In other embodiments, some of the weights may have zero values. FIG. 6A also shows column indexes 613 and row indexes 615 of the weights. The IFM matrix 620 is a matrix including three rows and three columns. FIG. 6A also shows the row indexes 625 and column indexes 623 of the elements in the IFM matrix 620. The IFM matrix 620 has sparsity, as it includes five elements with zero values. Given the sparsity, the IFM matrix 620 may be compressed, e.g., into a compressed sparse format, to make the IFM matrix 620 denser, i.e., having less zero valued elements. However, the IFM matrix 620 may be stored as is without any compression. The weight matrix 610 and IFM matrix 620 may be read from the system memory into a compression logic, e.g., the compression module 230 in FIG. 2. The compression module 230 can change the format how the weight matrix 610 and IFM matrix 620.

FIG. 6B illustrates a weight matrix 630 converted from the weight matrix 610 in FIG. 6A by the compression module 230, in accordance with various embodiments. The weight matrix 630 is an intermediate representation of the weight matrix 610. In FIG. 6B, the weights 637 are stored with their row indexes 635 and column indexes 633. The weight matrix can be further transmitted to the weight memory 250 and stored in the weight memory 250. The row indexes 635 and column indexes 633 can identify the locations of the weight in the weight memory 250 and can be used to read the weights from the weight memory 250. In an embodiment, a row or column index has more bits than a weight itself. For instance, a row or column index may take 12 bits but a weight can take 1 bit.

Figure 6C:
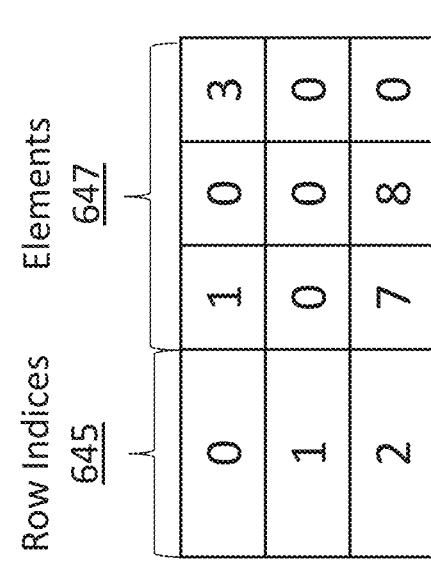
FIG. 6C illustrates an uncompressed state of the IFM matrix in FIG. 6A, in accordance with various embodiments.

FIG. 6C illustrates an uncompressed state of the IFM matrix 620 in FIG. 6A, in accordance with various embodiments. The uncompressed state of the IFM matrix 620 is referred to as "uncompressed IFM 640." The uncompressed IFM 640 can be converted from the IFM matrix 620 in FIG. 6A by the compression module 230 in FIG. 2. As shown in FIG. 6B, the row index 645 are stored as a new column in the uncompressed IFM 640, together with the elements 647. The uncompressed IFM 640 can be stored in the input memory 270 and further transmitted to the PE 280 for MAC operations. As shown in FIG. 6C, all the elements of the IFM matrix 620 are present in the uncompressed IFM 640, the uncompressed IFM 640 has not been compressed. Demultiplexing operations are not necessary.

FIG. 6D illustrates a compressed state of the IFM matrix 620 in FIG. 6A, in accordance with various embodiments. The uncompressed state of the IFM matrix 620 is referred to as "compressed IFM 650." The compressed IFM matrix 650 may be generated by the compression module 230 in FIG. 2. For instance, the compression module 230 converts the storage format of the IFM matrix 620 and compresses the IFM matrix 620. The compression process includes removal of elements 657 having zero values. As described above, the compression module 230 may compress data into various compressed sparse formats. In the embodiment of FIG. 6, the compressed IFM 650 has the COO format. As shown in FIG. 6C, the elements 657 in the compressed IFM 650 are sorted first by row indexes 655 and then by column indexes 653. Such an arrangement can improve random access times and is good for incremental matrix construction. The elements 657 having zero values as well as their column indexes are shaded in FIG. 6D. None of the row indexes 655 are shaded as each row includes at least one non-zero valued element.

Example DL Environment

FIG. 7 illustrates a DL environment 700, in accordance with various embodiments. The DL environment 700 includes a DL server 710 and a plurality of client devices 720 (individually referred to as client device 720). The DL server 710 is connected to the client devices 720 through a network 740. In other embodiments, the DL environment 700 may include fewer, more, or different components.

The DL server 710 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 710 can use various types of DNNs, such as CNN, recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 710 may build DL models specific to particular types of problems that need to be solved. A DL model is trained to receive an input and outputs the solution to the particular problem.

In FIG. 7, the DL server 710 includes a DNN system 750, a database 760, and a distributer 770. The DNN system 750 trains DNNs. The DNNs can be used to solve various problems, e.g., process images captured by autonomous vehicles, medical devices, satellites, and so on. In an embodiment, a DNN receives an input image and outputs classifications of objects in the input image. An example of the DNNs is the DNN 1400 described above in conjunction with FIG. 14.

The database 760 stores data received, used, generated, or otherwise associated with the DL server 710. For example, the database 760 stores a training dataset that the DNN system 750 uses to train DNNs. In an embodiment, the training dataset is an image gallery that can be used to train a DNN for classifying images. The training dataset may include data received from the client devices 720. As another example, the database 760 stores hyperparameters of the neural networks built by the DL server 710.

The distributer 770 distributes DL models generated by the DL server 710 to the client devices 720. In some embodiments, the distributer 770 receives a request for a DNN from a client device 720 through the network 740. The request may include a description of a problem that the client device 720 needs to solve. The request may also include information of the client device 720, such as information describing available computing resource on the client device. The information describing available computing resource on the client device 720 can be information indicating network bandwidth, information indicating available memory size, information indicating processing power of the client device 720, and so on. In an embodiment, the distributer may instruct the DNN system 750 to generate a DNN in accordance with the request. The DNN system 750 may generate a DNN based on the description of the problem. Alternatively or additionally, the DNN system 750 may compress a DNN based on the information describing available computing resource on the client device.

In some embodiments, the distributer 770 may receive feedback from the client device 720. For example, the distributer 770 receives new training data from the client device 720 and may send the new training data to the DNN system 750 for further training the DNN. As another example, the feedback includes an update of the available computer resource on the client device 720. The distributer 770 may send a different DNN to the client device 720 based on the update. For instance, after receiving the feedback indicating that the computing resources of the client device 720 have been reduced, the distributer 770 sends a DNN of a smaller size to the client device 720.

The client devices 720 receive DNNs from the distributer 770 and applies the DNNs to solve problems, e.g., to classify objects in images. In various embodiments, the client devices 720 input images into the DNNs and uses the output of the DNNs for various applications, e.g., visual reconstruction, augmented reality, robot localization and navigation, medical diagnosis, weather prediction, and so on. A client device 720 may be one or more computing devices capable of receiving user input as well as transmitting and/or receiving data via the network 740. In one embodiment, a client device 720 is a conventional computer system, such as a desktop or a laptop computer. Alternatively, a client device 720 may be a device having computer functionality, such as a personal digital assistant (PDA), a mobile telephone, a smartphone, an autonomous vehicle, or another suitable device. A client device 720 is configured to communicate via the network 740. In one embodiment, a client device 720 executes an application allowing a user of the client device 720 to interact with the DL server 710 (e.g., the distributer 770 of the DL server 710). The client device 720 may request DNNs or send feedback to the distributer 770 through the application. For example, a client device 720 executes a browser application to enable interaction between the client device 720 and the DL server 710 via the network 740. In another embodiment, a client device 720 interacts with the DL server 710 through an application programming interface (API) running on a native operating system of the client device 720, such as IOS® or ANDROID™.

In an embodiment, a client device 720 is an integrated computing device that operates as a standalone network-enabled device. For example, the client device 720 includes display, speakers, microphone, camera, and input device. In another embodiment, a client device 720 is a computing device for coupling to an external media device such as a television or other external display and/or audio output system. In this embodiment, the client device 720 may couple to the external media device via a wireless interface or wired interface (e.g., an HDMI cable) and may utilize various functions of the external media device such as its display, speakers, microphone, camera, and input devices. Here, the client device 720 may be configured to be compatible with a generic external media device that does not have specialized software, firmware, or hardware specifically for interacting with the client device 720.

The network 740 supports communications between the DL server 710 and client devices 720. The network 740 may comprise any combination of local area and/or wide area networks, using both wired and/or wireless communication systems. In one embodiment, the network 740 may use standard communications technologies and/or protocols. For example, the network 740 may include communication links using technologies such as Ethernet, 807.11, worldwide interoperability for microwave access (WiMAX), 3G, 4G, code division multiple access (CDMA), digital subscriber line (DSL), etc. Examples of networking protocols used for communicating via the network 740 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 740 may be represented using any suitable format, such as hypertext markup language (HTML) or extensible markup language (XML). In some embodiments, all or some of the communication links of the network 740 may be encrypted using any suitable technique or techniques.

Example DNN System

Figure 8:
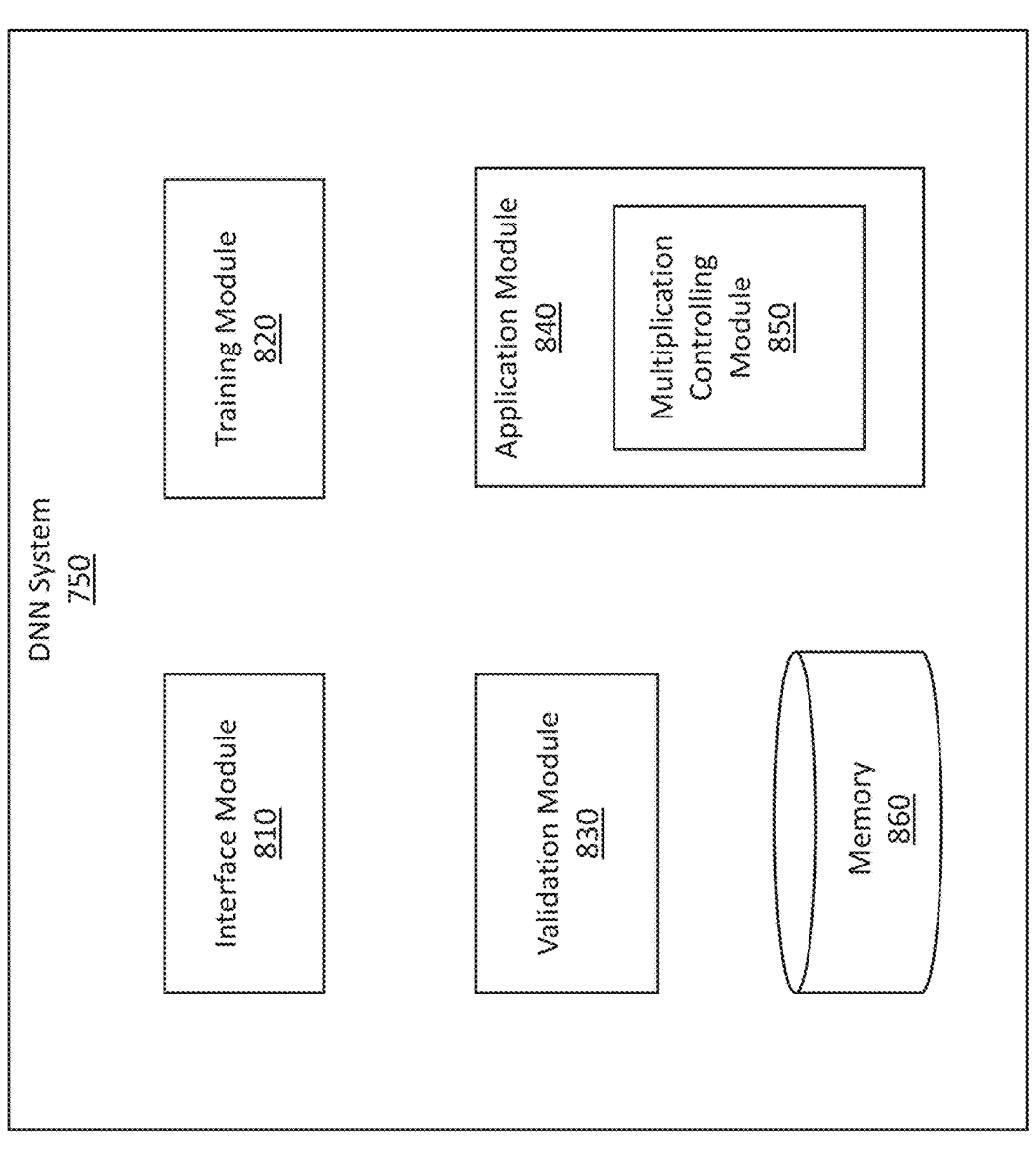
FIG. 8 is a block diagram of a DNN system, in accordance with various embodiments.

FIG. 8 is a block diagram of the DNN system 750, in accordance with various embodiments. The DNN system 750 trains and applies DNNs to solve various problems, such as image classification, learning relationships between biological cells (e.g., DNA, proteins, etc.), control behaviors for devices (e.g., robots, machines, etc.), and so on. The DNN system 750 includes an interface module 810, a training module 820, a validation module 830, an application module 840, and a memory 860. In other embodiments, alternative configurations, different or additional components may be included in the DNN system 750. Further, functionality attributed to a component of the DNN system 750 may be accomplished by a different component included in the DNN system 750 or a different system.

The interface module 810 facilitates communications of the DNN system 750 with other systems. For example, the interface module 810 establishes communications between the DNN system 750 with an external database to receive data that can be used to train DNNs or input into DNNs to perform tasks. As another example, the interface module 810 supports the DNN system 750 to distribute DNNs to other systems, e.g., computing devices configured to apply DNNs to perform tasks.

The training module 820 trains DNNs by using a training dataset. The training module 820 forms the training dataset. An example of the training dataset includes training objects and training labels. A training label describe a ground-truth of a corresponding training object. In some embodiments, a part of the training dataset may be used to initially train the DNN, and the rest of the training dataset may be held back as a validation subset to validate trained DNNs by the validation module 840.

The training module 820 also determines hyperparameters for training the DNN. Hyperparameters are variables specifying the DNN training process. In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. An epoch may include one or more batches. The number of epochs may be 10, 100, 500, 1000, or even larger. Hyperparameters are different from parameters inside the DNN (e.g., weights of filters).

The training module 820 defines the architecture of the DNN, e.g., based on some of the hyperparameters. The architecture of the DNN includes an input layer, an output layer, and a plurality of hidden layers. The training module 820 inputs the training dataset into the DNN and modifies the parameters inside the DNN to minimize the error between the generated labels of the training objects and the training labels. The parameters include weights of filters in the convolutional layers of the DNN. In some embodiments, the training module 210 uses a cost function to minimize the error. After the training module 820 finishes the predetermined number of epochs, the training module 820 may stop updating the parameters in the DNN. The DNN having the updated parameters is referred to as a trained DNN.

The validation module 830 verifies accuracy of trained DNNs. In some embodiments, the validation module 830 inputs samples in a validation dataset into a DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 830 determines may determine an accuracy score measuring the precision, recall, or a combination of precision and recall of the DNN. The validation module 830 may use the following metrics to determine the accuracy score: Precision=TP (TP+FP) and Recall=TP (TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 830 may compare the accuracy score with a threshold score. In an example where the validation module 830 determines that the accuracy score of the augmented model is lower than the threshold score, the validation module 830 instructs the training module 820 to re-train the DNN. In one embodiment, the training module 820 may iteratively re-train the DNN until the occurrence of a stopping condition, such as the accuracy measurement indication that the DNN may be sufficiently accurate, or a number of training rounds having taken place.

The application module 840 applies the trained DNN to perform tasks. For instance, the application module 840 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the application module 840 distributes the DNN to other systems, e.g., computing devices in communication with the DNN system 750, for the other systems to apply the DNN to perform the tasks.

In FIG. 8, the application module 840 includes a multiplication controlling module 850. The multiplication controlling module 850 controls matrix computation in the DNN. An embodiment of the multiplication controlling module 850 is the multiplication controller 255 in FIG. 2. In some embodiments, the multiplication controlling module 850 determines whether or when matrix computation is performed in the DNN based on values of weights. For instance, the multiplication controlling module 850 retrieves a weight matrix from a WRAM that stores weight matrices of a layer of the DNN. The multiplication controlling module 850 identifies a row of the weight matrix and determines a row value based on the values of the weights in the row. For instance, the multiplication controlling module 850 determines whether the row has a non-zero valued weight. In response to determining that the row has a non-zero valued weight, the multiplication controlling module 850 determines that the row value is one. Otherwise, the multiplication controlling module 850 determines that the row value is zero. The multiplication controlling module 850 may send the row values to a buffer, e.g., the buffer 260, which temporarily stores the row values. The row values are used to control whether a PE in the DNN layer receives weights and input data for MAC operations.

In some embodiments, a row value is sent to two switches. The first switch, after receiving a row value of one, sends a read request to the WRAM to read weights in the row corresponding to the row value. However, in embodiments where the row value is zero, the first switch does not send any read request to the WRAM. The second switch, after receiving a row value of one, forms a data transmission path between a IRAM of the DNN layer to the PE. The data transmission path may include a bus connecting the IRAM to the PE through a wide bandwidth. In some embodiments, the second switch closes, as triggered by the one valued row value, to form the data transmission bus. The IRAM stores a IFM matrix of the DNN layer. Data in the IFM matrix ("input data") can be sent to the PE through the data transmission path. The IRAM may also store weights read from the WRAM so that both the input data and weights can be transmitted to the PE through the data transmission path.

By controlling read and transmission of weights and input data, the multiplication controlling module 850 prevents the PE from performing MAC operations in scenarios where the row value is zero, i.e., all the weights in the row are zero valued. Thus, the multiplication controlling module 850 improves the efficiency of the DNN layer. Moreover, as the multiplication controlling module 850 and switches are near the WRAM and IRMA, data movement between the multiplication controlling module 850, WRAM, IRMA, and PE can be minimized, meaning consumption of time and computational resources can also be minimized.

The memory 860 stores data received, generated, used, or otherwise associated with the DNN system 750. For example, the memory 860 stores the datasets used by the training module 820 and the validation module 830. The memory 860 may also store data generated by the training module 820, validation module 830, and application module 840, such as the hyperparameters for training DNNs, algorithms for compressing DNNs, etc. The memory 860 may further store internal parameters of DNNs generated by the training module 820. In the embodiment of FIG. 1, the memory 860 is a component of the DNN system 750. In other embodiments, the memory 860 may be external to the DNN system 750 and communicate with the DNN system 750 through a network.

Example Method of Accelerating DNN Layers

FIG. 9 is a flowchart showing a method of controlling sparse matrix computation in a DNN, in accordance with various embodiments. The method 900 may be performed by the multiplication controlling module 850 described above in conjunction with FIG. 8. Although the method 900 is described with reference to the flowchart illustrated in FIG. 9, many other methods for controlling sparse matrix computation in deep learning may alternatively be used. For example, the order of execution of the steps in FIG. 9 may be changed. As another example, some of the steps may be changed, eliminated, or combined.

The multiplication controlling module 850 accesses 910 a weight matrix from a RAM. In some embodiments, multiplication controlling module 850 accesses the weight matrix from the RAM through a narrow bandwidth. The weight matrix includes a plurality of rows. The multiplication controlling module 850 identifies 920 a row of the weight matrix. The row includes a plurality of weights.

The multiplication controlling module 850 determines 930 whether a weight in the plurality of weights has a non-zero value. In response to determine that the weight has the non-zero value, the multiplication controlling module 850 determines 940 that a row value for the row is one. The multiplication controlling module 850 further sends 950 the row value to a buffer configured to store the row value. The row value is used to allow read of the plurality of weights from the RAM.

The row value can be further used to form a data transmission path between an additional RAM and a PE. The data transmission path may have a wide bandwidth. The additional RAM is configured to store input data. The PE is configured to perform multiplication operations and accumulation operations based on the input data and the plurality of weights. The plurality of weights read from the RAM may be transmitted into the additional RAM.

In some embodiments, the multiplication controlling module 850 also identifies an additional row of the weight matrix. The additional row comprising additional weights. The multiplication controlling module 850 determines whether any of the additional weights have a non-zero value. In response to determine that none of the additional weights have a non-zero value, the multiplication controlling module 850 determines that an additional row value for the additional row is zero. The multiplication controlling module 850 sends the additional row value to the buffer. The additional row value used to prevent read of the additional weights from the RAM.

Example Computing Device

Figure 10:
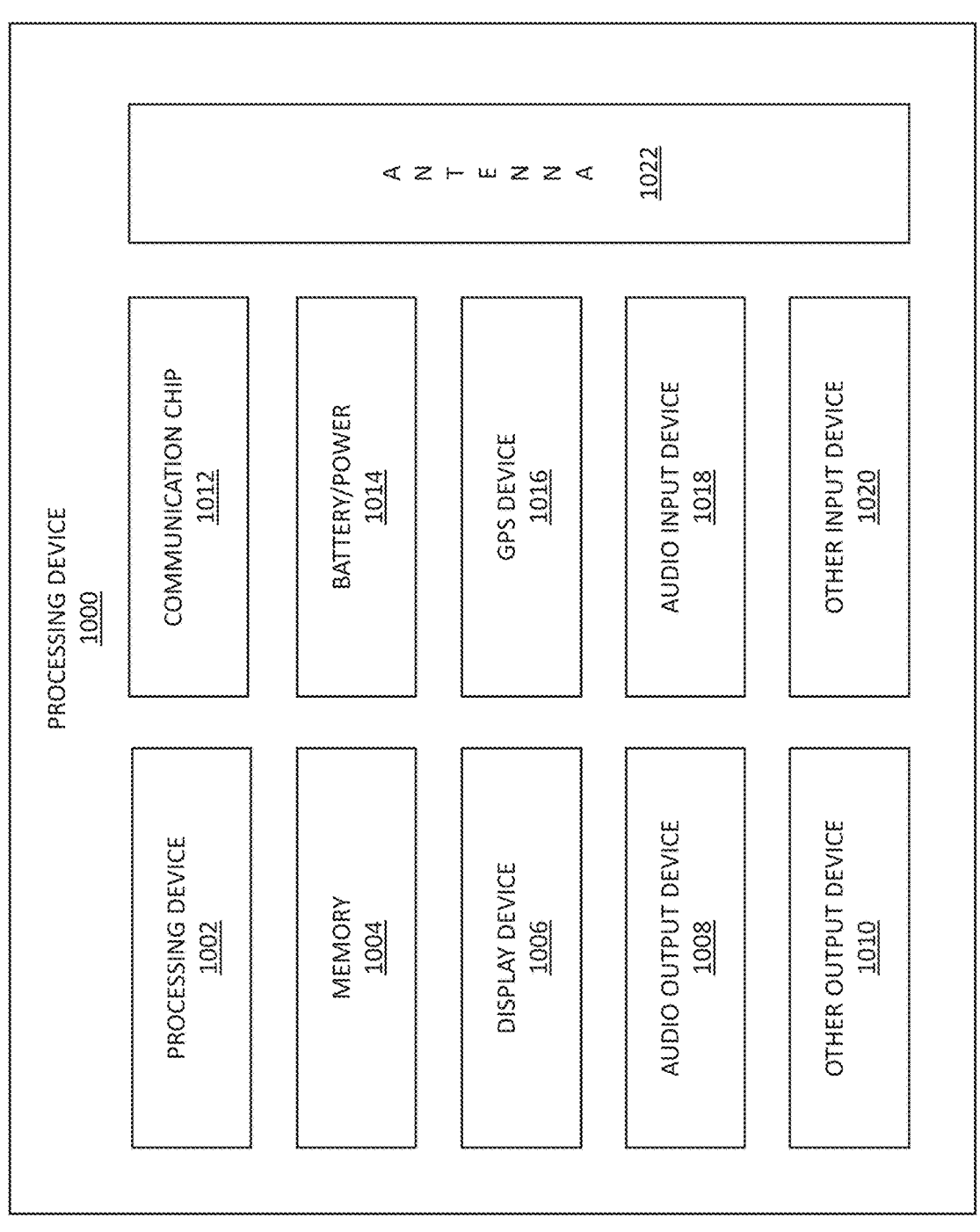
FIG. 10 is a block diagram of an example computing device, in accordance with various embodiments.

FIG. 10 is a block diagram of an example computing system for use as the DNN system 750, in accordance with various embodiments. A number of components are illustrated in FIG. 10 as included in the computing system 1000, but any one or more of these components may be omitted or duplicated, as suitable for the application. In some embodiments, some or all of the components included in the computing system 1000 may be attached to one or more motherboards. In some embodiments, some or all of these components are fabricated onto a single system on a chip (SoC) die. Additionally, in various embodiments, the computing system 1000 may not include one or more of the components illustrated in FIG. 10, but the computing system 1000 may include interface circuitry for coupling to the one or more components. For example, the computing system 1000 may not include a display device 1006, but may include display device interface circuitry (e.g., a connector and driver circuitry) to which a display device 1006 may be coupled. In another set of examples, the computing system 1000 may not include an audio input device 1018 or an audio output device 1008, but may include audio input or output device interface circuitry (e.g., connectors and supporting circuitry) to which an audio input device 1018 or audio output device 1008 may be coupled.

The computing system 1000 may include a processing device 1002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1002 may include one or more digital signal processors (DSPs), application-specific ICs (ASICs), CPUs, GPUs, cryptoprocessors (specialized processors that execute cryptographic algorithms within hardware), server processors, or any other suitable processing devices. The computing system 1000 may include a memory 1004, which may itself include one or more memory devices such as volatile memory (e.g., DRAM), nonvolatile memory (e.g., read-only memory (ROM)), flash memory, solid state memory, and/or a hard drive. In some embodiments, the memory 1004 may include memory that shares a die with the processing device 1002. In some embodiments, the memory 1004 includes one or more non-transitory computer-readable media storing instructions executable to perform operations for accelerating sparse matrix computation in deep learning. The instructions stored in the one or more non-transitory computer-readable media may be executed by the processing device 1002.

In some embodiments, the computing system 1000 may include a communication chip 1012 (e.g., one or more communication chips). For example, the communication chip 1012 may be configured for managing wireless communications for the transfer of data to and from the computing system 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing system 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing system 1000 may include battery/power circuitry 1014. The battery/power circuitry 1014 may include one or more energy storage devices (e.g., batteries or capacitors) and/or circuitry for coupling components of the computing system 1000 to an energy source separate from the computing system 1000 (e.g., AC line power).

The computing system 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing system 1000 may include an audio output device 1008 (or corresponding interface circuitry, as discussed above). The audio output device 1008 may include any device that generates an audible indicator, such as speakers, headsets, or earbuds, for example.

The computing system 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing system 1000 may include a GPS device 1016 (or corresponding interface circuitry, as discussed above). The GPS device 1016 may be in communication with a satellite-based system and may receive a location of the computing system 1000, as known in the art.

The computing system 1000 may include an other output device 1010 (or corresponding interface circuitry, as discussed above). Examples of the other output device 1010 may include an audio codec, a video codec, a printer, a wired or wireless transmitter for providing information to other devices, or an additional storage device.

The computing system 1000 may include an other input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing system 1000 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing system 1000 may be any other electronic device that processes data.

Selected Examples

Example 1 provides an apparatus for accelerating a deep neural network (DNN) layer, the apparatus including a multiplication controller configured to: access a weight matrix, the weight matrix including a plurality of rows, and determine a row value for each respective row of the plurality of rows based on values of weights in the respective row; a buffer configured to store the row values determined by the multiplication controller; one or more switches controlled by the row values, the one or more switches configured to control read and transmission operations associated with the weight matrix; and a processing element configured to perform multiplication operations and accumulation operations based on the weight matrix.

Example 2 provides the apparatus of example 1, where the multiplication controller is configured to determine the row value for each respective row of the plurality of rows based on the values of the weights in the respective row by determining whether the values of the weights in the respective row include a non-zero value; and in response to determining that the values of the weights in the respective row include a non-zero value, determining that the row value equals to one.

Example 3 provides the apparatus of example 2, where the multiplication controller is configured to determine the row value for each respective row of the plurality of rows based on the values of the weights in the respective row further by in response to determining that the values of the weights in the respective row do not include a non-zero value, determining that the row value equals to zero.

Example 4 provides the apparatus of example 1, further including a random-access memory storing the weight matrix.

Example 5 provides the apparatus of example 4, where the multiplication controller is configured to access the weight matrix from the random-access memory through a narrow bandwidth.

Example 6 provides the apparatus of example 4, where the one or more switches are configured to control the read and transmission operations associated with the weight matrix by accessing a row value from the buffer; determining whether the row value equals to one; and in response to determining that the row value equals to one, sending a read request to the random-access memory to read the weights in the row corresponding to the row value.

Example 7 provides the apparatus of example 1, further including a random-access memory storing input data of the DNN layer; and a bus configured to connect the random-access memory to the processing element, the bus controlled by a switch of the one or more switches.

Example 8 provides the apparatus of example 7, where the switch is configured to accessing a row value from the buffer; determining whether the row value equals to one; and in response to determining that the row value equals to one, controlling the bus to connect the random-access memory to the processing element for transmitting the input data from the random-access memory to the processing element.

Example 9 provides the apparatus of example 8, where the input data is transmitted from the random-access memory to the processing element through a wide bandwidth.

Example 10 provides the apparatus of example 1, where the processing element includes multipliers configured to perform the multiplication operations; and accumulators configured to perform the accumulator operations, an accumulation operation of an accumulator including accumulating an output of a multiplier and an output of another accumulator.

Example 11 provides the apparatus of example 10, where the processing element further includes a demultiplexer coupled to the multipliers and accumulators, the demultiplexer configured to perform demultiplexing operations on outputs of the multipliers, a demultiplexing operation including adding elements having values of zero into an output of a multiplier.

Example 12 provides the apparatus of example 11, where each respective multiplier of the multipliers corresponds to a different accumulator of the accumulators, and the demultiplexer is further configured to send a result of a demultiplexing operation on an output of the respective multiplier to the corresponding accumulator.

Example 13 provides the apparatus of example 11, further including a compression module that generates input data by compressing an input feature map matrix of the DNN layer, where the multipliers are configured to perform the multiplication operations on the input data.

Example 14 provides a method for controlling sparse matrix computation in deep learning, the method including accessing a weight matrix from a random-access memory, the weight matrix including a plurality of rows; identifying a row of the weight matrix, the row including a plurality of weights; determining whether a weight in the plurality of weights has a non-zero value; in response to determine that the weight has the non-zero value, determining that a row value for the row is one; and sending the row value to a buffer configured to store the row value, the row value used to allow read of the plurality of weights from the random-access memory.

Example 15 provides the method of example 14, further including identifying an additional row of the weight matrix, the additional row including additional weights; determining whether any of the additional weights have a non-zero value; in response to determine that none of the additional weights have a non-zero value, determining that an additional row value for the additional row is zero; and sending the additional row value to the buffer, the additional row value used to prevent read of the additional weights from the random-access memory.

Example 16 provides the method of example 14, where accessing the weight matrix from the random-access memory includes accessing the weight matrix from the random-access memory through a narrow bandwidth.

Example 17 provides the method of example 14, where the row value is further used to form a data transmission path between an additional random-access memory and a processing element, the random-access memory configured to store input data, the processing element configured to perform multiplication operations and accumulation operations based on the input data and the plurality of weights.

Example 18 provides the method of example 17, where the plurality of weights read from the random-access memory is transmitted into the additional random-access memory.

Example 19 provides the method of example 17, where the data transmission path has a wide bandwidth.

Example 20 provides one or more non-transitory computer-readable media storing instructions executable to perform operations for accelerating a deep neural network (DNN) layer, the operations including accessing a weight matrix from a random-access memory, the weight matrix including a plurality of rows; identifying a row of the weight matrix, the row including a plurality of weights; determining whether a weight in the plurality of weights has a non-zero value; in response to determine that the weight has the non-zero value, determining that a row value for the row is one; and sending the row value to a buffer configured to store the row value, the row value used to allow read of the plurality of weights from the random-access memory.

Example 21 provides the one or more non-transitory computer-readable media of example 20, where the operations further include identifying an additional row of the weight matrix, the additional row including additional weights; determining whether any of the additional weights have a non-zero value; in response to determine that none of the additional weights have a non-zero value, determining that an additional row value for the additional row is zero; and sending the additional row value to the buffer, the additional row value used to prevent read of the additional weights from the random-access memory.

Example 22 provides the one or more non-transitory computer-readable media of example 20, where accessing a weight matrix from a random-access memory includes accessing a weight matrix from a random-access memory through a narrow bandwidth.

Example 23 provides the one or more non-transitory computer-readable media of example 20, where the row value is further used to form a data transmission path between an additional random-access memory and a processing element, the random-access memory configured to store input data, the processing element configured to perform multiplication operations and accumulation operations based on the input data and the plurality of weights.

Example 24 provides the one or more non-transitory computer-readable media of example 23, where the plurality of weights read from the random-access memory is transmitted into the additional random-access memory.

Example 25 provides the one or more non-transitory computer-readable media of example 23, where the data transmission path has a wide bandwidth.

The above description of illustrated implementations of the disclosure is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. An apparatus for accelerating a deep neural network (DNN) layer, the apparatus comprising:
 a multiplication controller to:
  access a weight matrix, the weight matrix comprising a plurality of rows, and
  determine a row value for each respective row of the plurality of rows based on values of weights in the respective row;
 a buffer to store the row values determined by the multiplication controller;
 a processing element configured to perform multiplication operations and accumulation operations in the DNN layer;
 a weight memory to store the weight matrix;
 an input memory to store an activation matrix of the DNN layer;
 a first switch, the first switch to control weight transmission from the weight memory to the processing element in accordance with the row value; and
 a second switch, the second switch to control activation transmission from the input memory to the processing element in accordance with the row value.

2. The apparatus of claim 1, wherein the multiplication controller is configured to determine the row value for each respective row of the plurality of rows based on the values of the weights in the respective row by:
 determining whether the values of the weights in the respective row include a non-zero value; and
 in response to determining that the values of the weights in the respective row include a non-zero value, determining that the row value equals to one.

3. The apparatus of claim 2, wherein the multiplication controller is configured to determine the row value for each respective row of the plurality of rows based on the values of the weights in the respective row further by:
 in response to determining that the values of the weights in the respective row do not include a non-zero value, determining that the row value equals to zero.

4. The apparatus of claim 1, wherein the first switch is to control the weight transmission from the weight memory to the processing element by:
 accessing a row value from the buffer;
 determining whether the row value equals to one; and
 in response to determining that the row value equals to one, sending a read request to the weight memory to read the weights in the row corresponding to the row value.

5. The apparatus of claim 1, further comprising:
 a bus configured to connect the input memory to the processing element, the bus controlled by the second switch.

6. The apparatus of claim 5, wherein the second switch is to control activation transmission from the input memory to the processing element by:
 accessing a row value from the buffer;
 determining whether the row value equals to one; and
 in response to determining that the row value equals to one, controlling the bus to connect the input memory to the processing element for transmitting one or more activations from the input memory to the processing element.

7. The apparatus of claim 1, wherein the processing element comprises:
 multipliers configured to perform the multiplication operations; and
 accumulators configured to perform the accumulator operations.

8. The apparatus of claim 7, wherein the processing element further comprises:
 a demultiplexer coupled to the multipliers and accumulators, the demultiplexer configured to perform demultiplexing operations on outputs of the multipliers, a demultiplexing operation comprising adding elements having values of zero into an output of a multiplier.

9. The apparatus of claim 8, wherein each respective multiplier of the multipliers corresponds to a different accumulator of the accumulators, and the demultiplexer is further configured to send a result of a demultiplexing operation on an output of the respective multiplier to the corresponding accumulator.

10. The apparatus of claim 8, further comprising:
 a compression module that generates the activation matrix by compressing an input feature map matrix of the DNN layer.

11. A method for controlling sparse matrix computation in deep learning, the method comprising:
 storing an activation matrix of a deep neural network (DNN) layer in an input memory;
 storing a weight matrix of the DNN layer in a weight memory, the weight matrix comprising a plurality of rows;
 identifying a row of the weight matrix, the row comprising a plurality of weights;
 determining whether a weight in the plurality of weights has a non-zero value;
 in response to determining that the weight has the non-zero value, determining that a row value for the row is one;
 storing the row value in a buffer;
 controlling, by a first switch in accordance with the row value, weight transmission from the weight memory to a processing element;
 controlling, by a second switch in accordance with the row value, activation transmission from the input memory to the processing element; and perform, by the processing element using one or more activations from the input memory and one or more weights from the weight memory, multiplication operations and accumulation operations in the DNN layer.

12. The method of claim 11, further comprising:

identifying an additional row of the weight matrix, the additional row comprising additional weights;

determining whether any of the additional weights have a non-zero value;

in response to determine that none of the additional weights have a non-zero value, determining that an additional row value for the additional row is zero; and storing the additional row value in the buffer, the additional row value used to prevent the additional weights from being read from the weight memory.

13. The method of claim 11, wherein determining the row value comprises:

determining whether the values of the weights in the respective row include a non-zero value; and in response to determining that the values of the weights in the respective row include a non-zero value, determining that the row value equals to one.

14. The method of claim 13, wherein determining the row value further comprises:

in response to determining that the values of the weights in the respective row do not include a non-zero value, determining that the row value equals to zero.

15. The method of claim 11, further comprising:

generating the activation matrix by compressing an input feature map matrix of the DNN layer.

16. One or more non-transitory computer-readable media storing instructions executable to perform operations for accelerating a deep neural network (DNN) layer, the operations comprising:

storing an activation matrix of a deep neural network (DNN) layer in an input memory;

storing a weight matrix of the DNN layer in a weight memory, the weight matrix comprising a plurality of rows;

determining a row value for each respective row of the plurality of rows based on values of weights in the respective row;

storing the row value in a buffer;

controlling, by a first switch in accordance with the row value, weight transmission from the weight memory to a processing element;

controlling, by a second switch in accordance with the row value, activation transmission from the input memory to the processing element; and perform, by the processing element using one or more activations from the input memory and one or more weights from the weight memory, multiplication operations and accumulation operations in the DNN layer.

17. The one or more non-transitory computer-readable media of claim 16, wherein the operations further comprise:

identifying an additional row of the weight matrix, the additional row comprising additional weights;

determining whether any of the additional weights have a non-zero value;

in response to determine that none of the additional weights have a non-zero value, determining that an additional row value for the additional row is zero; and storing the additional row value in the buffer, the additional row value used to prevent read of the additional weights from the weight memory.

18. The one or more non-transitory computer-readable media of claim 16, wherein determining the row value comprises:

determining whether the values of the weights in the respective row include a non-zero value; and in response to determining that the values of the weights in the respective row include a non-zero value, determining that the row value equals to one.

19. The one or more non-transitory computer-readable media of claim 18, wherein determining the row value further comprises:

in response to determining that the values of the weights in the respective row do not include a non-zero value, determining that the row value equals to zero.

20. The one or more non-transitory computer-readable media of claim 16, wherein the operations further comprise:

generating the activation matrix by compressing an input feature map matrix of the DNN layer.

* * * * *